June 12, 1962     E. A. SCHWARZ ET AL     3,038,623

SPACED WALL CONTAINER

Filed Feb. 1, 1961

Inventors
Emil A. Schwarz
Marvin G. Kerr
John B. Haselhorst
By Rodney Bedell
F. Travers Burgess
attys.

United States Patent Office 3,038,623
Patented June 12, 1962

3,038,623
SPACED WALL CONTAINER
Emil A. Schwarz, Marvin G. Kern, and John B. Haselhorst, St. Louis, Mo., assignors to Crunden Martin Manufacturing Co., St. Louis, Mo., a corporation of Missouri
Filed Feb. 1, 1961, Ser. No. 86,398
5 Claims. (Cl. 215—13)

The invention relates to the securing of a container against rotation in a housing or casing shell provided for insulating or protecting the container. Such containers are usually provided with a closure which may be tightly threaded onto the container and it may be difficult to remove the closure because of the tendency of the closure to rotate in the casing and because of the fact that the container itself cannot be gripped to hold it against such rotation. A familiar example of such structure is in the ordinary picnic jug where only the neck of the jug projects from the shell of the insulated housing, and insulating material between the jug and the shell does not adequately resist rotation. Interengaging elements on the container and shell may loosen, break or become disaligned. The object of the present invention is to overcome the difficulties indicated, and the invention embodies an arcuate band applied to the container and having prongs extending in opposite directions for respectively engaging elements on the container and the shell to resist their relative rotation.

In the accompanying drawings illustrating a selected form of the invention:

Figure 1:
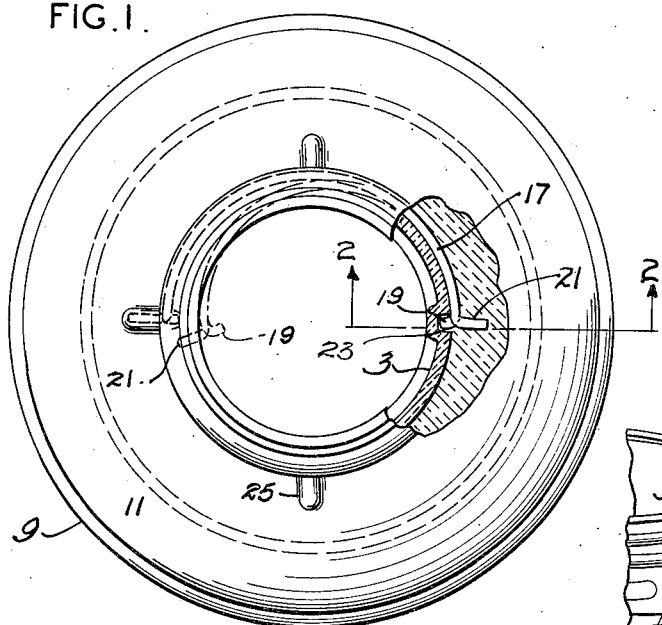
FIGURE 1 is a top view sectioned in part horizontally, approximately on line 1—1 of FIGURE 2, of an assembled container and shell.
Figure 3:
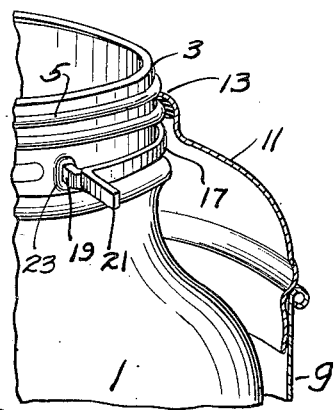
FIGURE 3 is a detail perspective of the container and lock with the shell shown in section.
Figure 2:
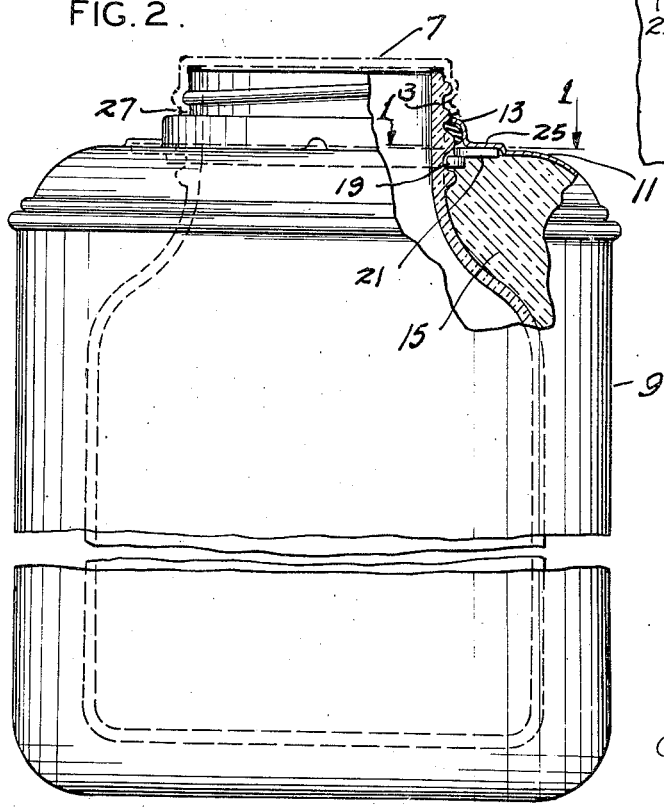
FIGURE 2 is a side elevation of the assembly sectioned in part vertically on line 2—2 of FIGURE 1.

The container 1 is shown as a glass jug, jar or bottle, having a cylindrical body and a neck 3 of reduced diameter with integral threads 5 on which a cap 7 may be screwed into a tight sealing position or may be unscrewed to pour or otherwise remove the contents of the jar. The shell usually is of metal or plastic and has a cylindrical side wall 9 and a top wall 11 extending inwardly from wall 9 to surround the jar neck 3 and form a rim 13 below the jar cap.

Tightening or unloosening the cap tends to rotate the jar in the shell irrespective of the presence of insulation 15, and to avoid such turning there is provided an arcuate band 17, here shown as extending 180° about the neck, provided with terminal prongs 19, 21 extending horizontally along radii of the band. A recess 23 in the neck receives the end of each prong 19 and a recess 25 in top wall 11 of the shell receives the major portion of each prong 21.

Band 17 preferably is of resilient material and has a normal radius somewhat less than the radius of neck 3 so that the band must be distorted by spreading its ends when it is applied to the neck. Hence the band may be assembled with the neck independently of the shell and will retain its position when assembled with the shell. When the shell top wall 11 is applied to the body 9, recesses 25 may be aligned vertically with prongs 21 so that elements 21 and 25 will be interengaged. If this is not done initially because wall 11 is too high, as cap 7 is screwed downwardly on the neck, its lower edge 27 will bear against rim 13 on the shell top wall 11 and press downwardly so that if elements 21 and 25 are not initially aligned and engaged, they will be as soon as the jar is rotated approximately 90°. The tighter the cap is screwed on, the more certain will be the engagement of the band and shell.

The application of the band to the jar neck is a preferred arrangement but it will be understood that the band may be made larger and applied to the body of the jar at a lower level than indicated in the drawings, and such an arrangement would embody substantially the same mechanical features. This and other variations in the structure may be made without departing from the spirit of the invention and the exclusive use of those modifications coming within the scope of the claims is contemplated.

What is claimed is:

1. In combination, an inner container, an outer container surrounding the same, said containers having generally cylindrical bodies, one surrounding the other, with a common longitudinal upright axis, the inner container having a neck portion of less diameter than its body and projecting upwardly above the same, and the upper end of the outer container body having a substantially horizontal flanged portion extending inwardly toward said neck portion and above the level of the top of said inner container, and means positively holding said containers against relative rotation about said axis comprising an arcuate band positioned horizontally between said containers and having prongs disposed radially of the band arc, one prong projecting into a radially disposed recess in said neck portion opening outwardly toward the band and the other prong projecting into a radially disposed recess in the underside of said flanged portion opening downwardly and inwardly toward said axis.

2. A combination of inner and outer containers and a holding band between them according to claim 1 in which the band extends substantially throughout 180° of arc and has a pair of prongs at each end positively engaging the recesses in the inner and outer container portions respectively.

3. A combination of inner and outer containers and a holding band between them according to claim 2 in which the band is of resilient material and normally has a radius less than the radius of the neck of the inner container and is distorted when applied to the containers and the prongs are at the ends of the band and are retained in position on the inner container by their inherent resiliency.

4. In combination, a container jug with a cylindrical body wall and a cylindrical neck of less diameter extending upwardly from the body wall, there being a radially opening recess in the outer periphery of the neck, a shell with a cylindrical wall surrounding the jug body wall and spaced substantially therefrom radially of the container and shell, the shell having a top wall extending from its cylindrical wall to the neck of the container and provided with a downwardly opening recess, the jug neck being threaded for screwing a cap downwardly tightly onto the jug, and means for holding the jug and shell against relative rotation about their common axis comprising a shallow arcuate anchor extending around a portion of the jug neck and having prongs extending transversely of said axis inwardly and outwardly respectively of the jug and container, at least one prong being received in a recess in the jug neck and another prong being received in said downwardly opening recess in the shell top wall.

5. A container, shell and anchor assembly according to claim 4 in which the shell top wall if too high initially may be forced downwardly by the screwing of a cap on the threaded neck to seat the prong in a groove.

References Cited in the file of this patent

UNITED STATES PATENTS

| | | |
|---|---|---|
| 884,315 | Carroll | Apr. 7, 1908 |
| 964,080 | Wolf | July 12, 1910 |
| 1,179,725 | Iversen | Apr. 18, 1916 |
| 1,416,232 | Osborn | May 16, 1922 |
| 1,477,101 | Brainard | Dec. 11, 1923 |
| 1,771,123 | Johnson | July 22, 1930 |
| 1,991,574 | Rabezzana | Feb. 19, 1935 |

FOREIGN PATENTS

| | | |
|---|---|---|
| 947,273 | Germany | Aug 16, 1956 |